(12) United States Patent
Heres et al.

(10) Patent No.: US 9,284,620 B2
(45) Date of Patent: Mar. 15, 2016

(54) INCREASE IN THE SEPARATION FACTOR BETWEEN AMERICIUM AND CURIUM AND/OR BETWEEN LANTHANIDES IN A LIQUID-LIQUID EXTRACTION OPERATION

(75) Inventors: Xavier Heres, Avignon (FR); Pascal Baron, Bagnols sur Ceze (FR)

(73) Assignees: Commissariat a l'energie atomique et aux energies alternatives, Paris (FR); AREVA NC, Paris (FR)

( * ) Notice: Subject to any disclaimer, the term of this patent is extended or adjusted under 35 U.S.C. 154(b) by 38 days.

(21) Appl. No.: 13/386,012

(22) PCT Filed: Jul. 26, 2010

(86) PCT No.: PCT/EP2010/060806
§ 371 (c)(1),
(2), (4) Date: Mar. 6, 2012

(87) PCT Pub. No.: WO2011/012579
PCT Pub. Date: Feb. 3, 2011

(65) Prior Publication Data
US 2012/0160061 A1    Jun. 28, 2012

(30) Foreign Application Priority Data
Jul. 27, 2009 (FR) ...................... 09 55240

(51) Int. Cl.
| C22B 60/00 | (2006.01) |
| C22B 3/26 | (2006.01) |
| C22B 59/00 | (2006.01) |
| G21C 19/46 | (2006.01) |
| G21F 9/12 | (2006.01) |
| C22B 60/02 | (2006.01) |

(52) U.S. Cl.
CPC ............... C22B 3/0005 (2013.01); C22B 59/00 (2013.01); G21C 19/46 (2013.01); G21F 9/125 (2013.01); *Y02P 10/234* (2015.11); *Y02W 30/883* (2015.05)

(58) Field of Classification Search
CPC ...... C22B 3/0005; C22B 59/00; G21C 19/46; G21F 9/46; G21F 9/125
USPC ................................................ 423/9; 75/393
See application file for complete search history.

(56) References Cited

U.S. PATENT DOCUMENTS

| 5,708,958 A | 1/1998 | Koma et al. |
| 7,157,003 B2 | 1/2007 | Baron et al. |
| 7,887,767 B2 | 2/2011 | Baron et al. |
| 2011/0002823 A1 | 1/2011 | Miguirditchian et al. |

FOREIGN PATENT DOCUMENTS

| EP | 1923473 | 5/2008 | | |
| FR | 2738663 | 3/1997 | | |
| FR | 2810679 | 12/2001 | | |
| FR | 2810679 A1 | 12/2001 | | |
| FR | 2907346 | 4/2008 | | |
| FR | WO2008049807 | * 5/2008 | ............ | B01D 11/04 |
| JP | 2005114448 | 4/2005 | | |

OTHER PUBLICATIONS

French Patent Office Search Report for Application No. 0955240, dated Mar. 17, 2010, in 3 pages.

Sasaki, Yuji, et al, "Complexation and Back Extraction of Various Metals by Water-soluble Diglycolamide," Analytical Sciences, Jun. 2007, pp. 727-731, vol. 23, The Japan Society for Analytical Chemistry.

Baron, P. et al., "Separation of the Minor Actinides: the Diamex-Sanex Concept," pp. 1-8, Commissariat a l'Energie Atomique (CEA), Valrho-Marcoule, DRCP, France.

Dhami, P.S., et al., "Studies on the Partitioning of Actinides from High Level Waste Using a Mixture of HDEHP and CMPO as Extractant," Separation Science and Technology, 2001, pp. 325-335, vol. 36(2), Marcel Dekker, Inc.

Weaver, Boyd, et al., "Talspeak: A New Method of Separating Americium and Curium from the Lanthanides by Extraction from an Aqueous Solution of an Aminopolyacetic Acid Complex with a Monoacidic Organophosphate or Phosphonate," Chemical Technology Division, Chemical Development Section C, Aug. 1964, in 64 pages, Oak Ridge National Laboratory operating by Union Carbide Corporation for the U.S. Atomic Energy Commission, U.S.

(Continued)

*Primary Examiner* — Kaj K Olsen
*Assistant Examiner* — Alexander Polyansky
(74) *Attorney, Agent, or Firm* — Knobbe Martens Olson and Bear LLP

(57) ABSTRACT

A method using diglycolamide for increasing the separation factor between americium and curium and/or between lanthanides during an extraction operation. The operation comprising putting an acid aqueous phase, in which are found the americium, curium and/or lanthanides, in contact with an organic phase non-miscible with water, containing at least one extractant in an organic diluent. The aqueous and organic phases are then separated, and the diglycolamide is added to the aqueous phase. This method can be used for processing and recycling irradiated nuclear fuels, in particular for selectively recovering americium from high activity aqueous solutions such as raffinates stemming from the processing of irradiated nuclear fuels with a PUREX or COEX™ method; processing of rare earth ores of the monazite, xenotime or bastnaesite type, in order to facilitate separation of <<lightweight>> rare earths from <<heavy>> rare earths and of yttrium, or that of two rare earths with adjacent or close atomic numbers.

11 Claims, No Drawings

(56) References Cited

OTHER PUBLICATIONS

Database Compendex. Modolo, "Development of a TOGDA based process for partiioning of actinides from a Purex raffinate", 2007.
Database WPI. Thomson Scientific, London 2005-319661.
Ansari, et al. "Counter-current extraction of uranium and lanthanides from simulated high-level waste using N,N, N',N'-tetraoctyl diglycolamide". Separation and Purification Technology, vol. 66, No. 1, pp. 118-124, 2009.
Database Compendex. Shimojo et al, "Extraction behavior of lanthanides using a diglycolamide derivative TOGDA inionic liquids".
Ansari et al, "Separation of Am(III) and trivalent lanthanides from simulated high-level waste using a hollow-fiber supported liquid membrane", Elsevier pp. 239-242, 2008.
International Search Report dated Oct. 29, 2010 for PCT Application No. PCT/EP2010/060806 filed Jul. 26, 2010.

* cited by examiner

INCREASE IN THE SEPARATION FACTOR BETWEEN AMERICIUM AND CURIUM AND/OR BETWEEN LANTHANIDES IN A LIQUID-LIQUID EXTRACTION OPERATION

RELATED APPLICATIONS

This application is a U.S. National Phase of International Application No. PCT/EP2010/060806, filed Jul. 26, 2010, designating the U.S., and published in French as WO 2011/012579 on Feb. 3, 2011 which claims the benefit of French Patent Application No. 0955240 filed Jul. 27, 2009.

BACKGROUND OF THE INVENTION

1. Field of the Invention

The present invention relates to the use of a particular family of complexing agents and, more specifically, diglycolamides, for increasing the separation factor between americium and curium and/or lanthanides in a liquid-liquid extraction operation.

The invention may find application in the field of processing and recycling irradiated nuclear fuels where it has a most particular advantage for selectively recovering americium from aqueous solutions with high activity such as for example raffinates stemming from the processing of irradiated nuclear fuels by a PUREX or COEX™ method.

It may also find application in the field of the processing of rare earth ores for example of the monazite, xenotime or bastnaesite type, in order to facilitate the separation of <<lightweight>> rare earths, i.e. with an atomic number of less than 63 (lanthanum, cerium, praseodymium, neodymium, samarium), of <<heavy>> rare earths, i.e. with an atomic number of more than 63 (europium, gadolinium, terbium, . . . ), and optionally yttrium which may be recovered pure, or the one of two rare earths with adjacent or close atomic numbers such as neodymium and samarium. Pure yttrium has many applications such as luminescence, fluorescence and optical materials.

2. Description of the Related Art

The methods, with which uranium and plutonium present in the dissolution liquors of irradiated nuclear fuels may be extracted and purified, such as the PUREX method (which is presently used in factories for processing irradiated nuclear fuels) and the COEX™ method (which is described in PCT International Application WO 2007/135178, [1]), generate effluents to which the name of raffinates is given.

These raffinates are aqueous solutions with strong nitric acidity, typically from 2 to 5 M, which contain two minor actinides, i.e. americium and curium, lanthanides such as lanthanum, cerium, praseodymium, neodymium, samarium and europium, fission products other than lanthanides such as molybdenum, zirconium, rubidium, ruthenium, rhodium, palladium and yttrium, as well as corrosion products such as iron and chromium.

Their handling presently consists of concentrating them as much as possible and then packaging them in glassy matrices with view to storing them before ultimate storage.

Since the beginning of the 90s, research has actively been conducted in France for achieving extensive separation of metal elements present in the raffinates stemming from the processing of irradiated nuclear fuels by the PUREX method. The main goal of this extensive separation is to reduce the radiotoxicity of the vitrified waste by removing from these raffinates the most radiotoxic elements with the purpose of transmuting them.

An extensive separation route was particularly explored: this is hydrometallurgy which is based on separation methods by liquid-liquid extraction.

Now, it is found that most extractants, the use of which has been suggested to this day such as diisobutylphenyloctylcarbamoylmethylphosphine (or CMPO) and other carbamoylphosphine oxides, trioctylphosphine oxide (or TOPO) and other phosphine oxides, N,N'-dimethyl-N,N'-dioctylhexylethoxymalonamide (or DMDOHEMA) and other malonamides, diisodecylphosphoric acid (or DIDPA) and other phosphoric acids, etc., has a not very marked selectivity, or even no selectivity at all, for americium with respect to curium. This is due to the very large similarity existing between the physicochemical properties of both of these elements.

The result of this is that it is presently extremely difficult to separate americium from curium by liquid-liquid extraction and that this separation, when it is possible, requires in order to obtain satisfactory separation performances, the use of a large number of stages, which is a penalty from the industrial point of view.

Now, it would be highly interesting to be able to selectively recover the americium present in the raffinates stemming from the processing or irradiated nuclear fuels by the methods of the PUREX or COEX™ type, before sending these raffinates to vitrification.

Indeed, in addition to reducing the radiotoxicity of vitrified waste, selective recovery of americium would allow significant lowering of the thermal load of this waste, and thereby their storage footprint.

Moreover, curium 244, which represents the majority isotope of the curium present in nuclear waste, is a powerful neutron emitter, a source of significant radioactivity. Recovering americium without curium would therefore allow considerable simplification in the manufacturing, handling and transport of transmutation fuel assemblies containing americium. Transmutation nuclear fuels may thereby contain more americium.

The Inventors therefore set their goal to finding a means which would generally allow facilitation of the separation of americium and of curium when it is sought to separate both of these elements from each other by liquid-liquid extraction.

They also set their goal that this means should be efficient and therefore usable both in the case when it is sought to separate americium from curium from an aqueous solution containing, in addition to both of these elements, lanthanides and other fission products and in the case when it is sought to separate americium from curium from an aqueous solution only containing both of these elements. In this perspective, they notably desired that this means should not set into play any oxidation-reduction reaction of americium or of any other metal element.

Finally, they set their goal that this means should be simple to apply and that its use at an industrial scale, downstream from a PUREX or COEX™ method, should not add to the constraints already imposed by these methods, additional constraints, notably in terms of handling of the generated effluents, of corrosion, toxicity and safety.

Now, it turns out that within the scope of their work, the Inventors noticed that the presence of a diglycolamide in an acid aqueous phase containing americium, curium, lanthanides and other fission products, when this aqueous phase is subject to a liquid-liquid extraction operation, i.e. when it is put into contact with an organic phase containing an extractant (other than a diglycolamide) and then separated from this phase, is expressed by a substantial increase in the separation factor between americium and curium as compared with the one obtained in the absence of diglycolamide and this, regardless of the selectivity level which the extractant contained in the organic phase has for americium with respect to curium.

Further they noticed that the presence of the diglycolamide in said acid aqueous phase is also expressed by an increase in the separation factor between <<lightweight>> lanthanides and <<heavy>> lanthanides as compared with that obtained in the absence of the diglycolamide.

These observations are at the basis of the present invention.

It should be noted that the use of diglycolamides and in particular of N,N,N',N'-tetra-octyldiglycolamide (or TODGA), is known, either alone or associated with other compounds of the tri-n-butyl phosphate (or TBP) or N,N-dihexyloctanamide (or DHOA) type, as extractants for extracting from an aqueous phase either lanthanides, or lanthanides and actinides(III), or lanthanides and actinides(III) and (IV), or further the whole of the actinides(III), (IV), (V) and (VI) (see for example ANSARI et al., *Separation and Purification Technology*, 66, 118-124, 2009 [2]; SHIMOJO et al., *Dalton Transactions*, 37, 5083-5088, 2008 [3]; MODOLO et al., *Solvent Extraction Ion Exchange*, 25, 703-720, 2007 [4]; French patent application 2 810 679 [5]; ANSARI et al., *Separation and Purification Technology*, 63, 239-242, 2008 [6]; Japanese patent application 2005-114448 [7] and French patent application 2 907 346 [8]).

The use of diglycolamides as complexing agents is also known for stripping from an organic phase, actinides, lanthanides and other fission products (see, for example SASAKI et al., *Analytical Sciences*, 23, 727-731, 2007 [9]).

On the other hand, what has never been proposed in the literature, is the use of diglycolamides as complexing agents for increasing the separation factor between americium and curium and/or between lanthanides in a liquid-liquid extraction operation.

DETAILED DESCRIPTION OF THE PREFERRED EMBODIMENT

The object of the present invention is therefore the use of a diglycolamide for increasing the separation factor between americium and curium and/or lanthanides which is obtained at the end of a liquid-liquid extraction operation comprising the putting of an acid aqueous phase in which are found americium, curium and/or lanthanides, in contact with an organic phase, non-miscible with water, containing at least one extractant other than a diglycolamide, in an organic diluent, and then the separation of said aqueous and organic phases, said diglycolamide being added to said aqueous phase.

In the field of liquid-liquid extractions it is recalled that the distribution coefficient of a metal element M, noted as $D_M$, corresponds to the ratio at equilibrium, of the concentrations (or activities) of this element in the organic and aqueous phases, and that the separation factor between two metal elements M1 and M2, noted as $FS_{M1/M2}$, corresponds to $D_{M1}/D_{M2}$, i.e. to the ratio of the distribution coefficients of the metal elements M1 and M2.

It is also recalled that diglycolamides are compounds of formula (I) hereafter:

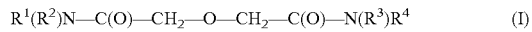

$$R^1(R^2)N-C(O)-CH_2-O-CH_2-C(O)-N(R^3)R^4 \quad (I)$$

wherein $R^1$, $R^2$, $R^3$ et $R^4$, which may be identical or different, are typically alkyl groups.

According to the invention, the diglycolamide is preferably selected from diglycolamides in which the total number of carbon atoms which $R^1$, $R^2$, $R^3$ and $R^4$ have together is at most equal to 20, so as to have sufficient hydrophilicity in order to be used in an aqueous phase.

Such diglycolamides are notably N,N,N',N'-tetramethyl-diglycolamide (or TMDGA), N,N,N',N'-tetraethyldiglycolamide (or TEDGA) and N,N,N',N'-tetrapropyldiglycolamide (or TPDGA), TEDGA being most preferred.

The diglycolamide is advantageously added to the acid aqueous phase in an amount such that its concentration in this phase is comprised between 0.01 and 0.5 mol/L and, even better, between 0.03 and 0.1 mol/L.

The extractant present in the organic phase is advantageously a solvating extractant, in which case it is preferably selected from solvating extractants which have selectivity, even very low selectivity, for americium relatively to curium, i.e. which are capable of more extracting the americium than the curium from an acid aqueous phase.

Such solvating extractants are notably:

malonamides such as N,N'-dimethyl-N,N'-dibutyltetradecylmalonamide (or DMDBTDMA), N,N'-dimethyl-N, N'-dioctylhexylethoxymalonamide (or DMDOHEMA), N,N'-dimethyl-N,N'-dioctyloctylmalonamide (or DMDOOMA), N,N'-dimethyl-N,N'-dioctylhexylmalonamide (or DMDOHxMA), N,N'-dimethyl-N,N'-dioctylheptyl-malonamide (or DMDOHpMA) or N,N'-dimethyl-N,N'-dibutyl-dodecylmalonamide (or DMDBDDEMA);

carbamoylphosphine oxides such as diisobutylphenyloctylcarbamoylmethylphosphine (or) CMPO;

triisobutylphosphine sulfides;

carbamoylphosphonates such as dihexyl-N,N-diethylcarbamoylmethylphosphonate (or DHDECMP); and mixtures thereof.

However, as shown in the examples hereafter, it is also possible to use a solvating extractant which does not have any selectivity for americium relatively to curium such as a phosphine oxide of the trioctylphosphine oxide (or TOPO) type or a mixture of phosphine oxides such as the mixture of trialkylphosphine oxides known under the acronym of TRPO.

Preferably, the extractant present in the organic phase is a malonamide, in which case the latter is advantageously DMDOHEMA.

An acid extractant (named in this way since it has one or more acid functions) may be added to the solvating extractant in order to for example increase the loading capacity of the solvating extractant or to modify the Am/Cm separation factor. It may itself notably be selected from:

acids containing phosphorus such as mono- and di-alkylphosphoric acids having at least 7 carbon atoms such as di(2-ethylhexyl)phosphoric acid (or HDEHP), (2-ethylhexyl)dihydrogen phosphate acid, diisodecylphosphoric acid (or DIDPA), mono- and di-alkylphosphonic acids such as 2-ethylhexyl-2-ethylhexylphosphonic acid (or HEHEHP), mono- and di-alkylphosphinic acids, thiophosphoric acids, thiophosphonic acids and thiophosphinic acids;

lipophilic carboxylic acids such as decanoic or dodecanoic acid;

sulfonic acids such as dinonyl-naphthalene sulfonic acid (or HDNNS); and mixtures thereof.

As for the organic diluent, it may preferably be selected from polar or aliphatic organic diluents, the use of which has been proposed for achieving liquid-liquid extractions and notably for processing irradiated nuclear fuels, such as toluene, xylene, t-butylbenzene, triisopropylbenzene, kerosene and linear or branched dodecanes such as n-dodecane or hydrogenated tetrapropylene (or TPH).

According to the invention, the acid aqueous phase is preferably a nitric aqueous solution stemming from the process of irradiated nuclear fuels and, even better, a solution which contains both americium, curium, lanthanides and other fission products and/or corrosion products, such as a raffinate stemming from the processing of irradiated nuclear fuels by a PUREX or COEX™ method.

In which case, the invention may be exploited for selectively recovering the americium, i.e. without any curium, any lanthanides or other fission and/or corrosion products, from this solution.

The extraction operation is then preferably carried out with nitric acidity ranging from 0.1 mol/L to 6 mol/L and is followed:
 by an operation for washing the organic phase stemming from this extraction operation; this washing operation, which allows enhancement of the separation of americium from curium, is carried out by means of a nitric aqueous phase, for example a 0.1 M to 6 M nitric solution, and advantageously containing a diglycolamide, which preferably is the same diglycolamide as the ones used for the extraction operation; and then
 by one or more operations with which the americium may be separated from the lanthanides and other fission and/or corrosion products which may have been extracted in the organic phase together with the americium, and which are carried out according to conditions which depend on the extractant present in said organic phase.
Thus, for example:
 if the extractant present in the organic phase is CMPO, the separation of the americium from lanthanides and other fission and/or corrosion products present in the organic phase may be achieved according to the same methods as those recommended in the state of the art for separating actinides(III) from lanthanides and other fission products from an organic phase containing CMPO, for example in a cycle with the SETFICS method (French patent application 2 738 663, [10]) or in two cycles with the TALSPEAK method (WEAVER and KAPPELMAN, ORNL-3559 report, 1964, [11]) in the second cycle; while
 if the extractant present in the organic phase is DMDOHEMA, the separation of the americium from the lanthanides and other fission and/or corrosion products present in the organic phase may be achieved according to the same conditions as those recommended in the state of the art for separating actinides(III) from lanthanides and other fission and/or corrosion products from an organic phase containing DMDOHEMA, for example in a cycle with the PALADIN method (French patent application 2 845 616 [12]).

Alternatively, the nitric aqueous solution stemming from the processing of irradiated nuclear fuels may also be a solution which only contains americium, curium and lanthanides, or even a solution which only contains americium and curium like a solution stemming from the processing of a PUREX or COEX™ raffinate by an extensive separation method such as the DIAMEX-SANEX method (BARON et al., *Proceedings of the International Conference on Back-End of the Fuel Cycle: From Research to Solutions GLOBAL '01*, Paris, France, Sep. 9-13, 2001, published by INIS-FR-1108) [13]; DHAMI P. S. et al., *Separation Science & Technology*, 36(2), 325-335, 2001 [14]).

According to the invention, the acid aqueous phase subject to the extraction operation may also be a nitric acid solution resulting from dissolution in nitric acid of a rare earth ore, for example of the monazite, xenotime or bastnaesite type, in which case this solution neither contains americium nor curium and the invention may be exploited for separating these rare earths from each other.

Other features and advantages of the invention will become apparent from the examples which follow and which relate to tests with which it was possible to show the capacity of diglycolamides of increasing the separation factor between americium and curium and between the lanthanides during extractions carried out by using aqueous phases simulating raffinates stemming from the processing of irradiated nuclear fuels by the PUREX method on the one hand and, different types of organic phase on the other hand.

It is obvious that these examples are only given as illustrations of the object of the invention and should by no means be interpreted as a limitation of this object.

EXAMPLES

Example 1

Extractions with an Organic Phase Containing CMPO and TBP in TPH

Extractions were carried out by using:
 as aqueous phases: four aqueous solutions—designated hereafter as S1, S2, S3 and S4—simulating raffinates stemming from the processing by the PUREX method of irradiated nuclear fuels of the UOX1-UOX2 type (except for what relates to americium 241 and to curium 244 which are only present in trace amounts in these solutions) and to which TEDGA was either added or not; and
 as organic phases: phases comprising 0.20 mol/L of CMPO (as a solvating extractant) and 1 mol/L of tri-n-butyl phosphate (or TBP, as a phase modifying agent) in TPH.

The qualitative and quantitative composition of each of the solutions S1 to S4 is shown in the Table 1 hereafter.

All the metal elements present in these solutions were dissolved in the form of nitrates.

TABLE I

| | Concentrations in mmol/L | | | |
|---|---|---|---|---|
| | S1 | S2 | S3 | S4 |
| HNO$_3$ | 1000 | 1000 | 1900 | 1900 |
| TEDGA | — | 15 | — | 30 |
| $^{241}$Am | $3.3 \cdot 10^{-3}$ | $3.3 \cdot 10^{-3}$ | $3.3 \cdot 10^{-3}$ | $3.3 \cdot 10^{-3}$ |
| $^{244}$Cm | $1.4 \cdot 10^{-4}$ | $1.4 \cdot 10^{-4}$ | $1.4 \cdot 10^{-4}$ | $1.4 \cdot 10^{-4}$ |
| Y | 0.15 | 0.17 | 0.30 | 0.33 |
| Gd | 0.07 | 0.07 | 0.13 | 0.14 |
| Eu | 0.09 | 0.10 | 0.17 | 0.19 |
| Sm | 0.36 | 0.39 | 0.72 | 0.77 |
| Nd | 1.92 | 2.00 | 3.88 | 3.92 |
| Pr | 0.76 | 0.81 | 1.54 | 1.59 |
| Ce | 1.39 | 1.47 | 2.81 | 2.89 |
| La | 0.71 | 0.75 | 1.42 | 1.46 |
| Pd | 1.26 | 1.26 | 2.51 | 2.51 |
| Mo | 2.99 | 3.16 | 6.07 | 6.21 |
| Zr | 3.27 | 3.49 | 6.61 | 6.84 |
| Fe | 0.46 | 0.49 | 0.91 | 0.93 |

Each of the solutions S1 to S4 was put into contact, in tubes, with one of the organic phases (acid-balanced beforehand, by adding 1 M nitric acid in the case of solutions S1 and S2, and 1.9 M nitric acid in the case of the solutions S2 and S4), in an amount of 1 volume of aqueous solution for 1 volume of organic phase, and the thereby contacted phases were left for 30 minutes with stirring at a constant temperature of 25° C.

After decantation and separation of the aqueous and organic phases, the activities of americium and curium in each of these phases were measured by α spectrometry.

The concentrations of the other metal elements in the aqueous phases were as for them measured by inductively coupled plasma atomic emission spectrometry (or ICP-AES) while the concentrations of these other metal elements in the organic phases were determined indirectly.

Indeed, the concentrations of the metal elements other than americium and curium in the organic phases were determined by quantitatively stripping these elements in aqueous phases and by then measuring with ICP-AES their concentrations in the aqueous phases having been used for this stripping. To do this, the organic phases were put into contact with aqueous phases each comprising 0.05 mol/L of N-(2-hydroxyethyl) ethylene diamine triacetic acid (or HEDTA), 0.5 mol/L of oxalic acid, 0.3 mol/L of TEDGA and 1 mol/L of nitric acid, in an amount of 1 volume of organic phase for 1 volume of aqueous phase, and left for 30 minutes with stirring at a constant temperature of 25° C.

Table II hereafter shows for each of the solutions S1-S4, the distribution coefficients $D_M$ and the separation factors $FS_{Am/M}$ obtained from the thereby determined activities and concentrations.

tion factors between the lanthanides relatively to those obtained in the absence of TEDGA. Thus, in the presence of TEDGA, <<lightweight>> lanthanides (La, Ce, Pr, Nd) are at least twice better extracted than americium while the <<heavy>> lanthanides (Eu and Gd) and yttrium are 7 to 55 times less well extracted than americium.

Finally, it shows that the presence of TEDGA in solutions S2 and S4 is expressed by an inhibition of zirconium since the separation factor between americium and zirconium changes from 0.4 to 85 in the presence of 0.015 mol/L of TEDGA (solution S1 versus solution S2) and from 0.3 to 148 in the presence of 0.030 mol/L of TEDGA in solution S3 versus solution S4).

These results are very interesting since it is possible to contemplate a realistic scheme for applying on an industrial scale a method, the goal of which would be to selectively recover americium from a high activity aqueous solution of the raffinate type stemming from the processing of irradiated nuclear fuels by a PUREX or COEX™ method and the first step of which would consist of extracting the americium from the solution, to which would be added TEDGA, by means of an organic phase containing a mixture of CMPO and of TBP in an organic diluent of the TPH type.

Indeed, in order that such an extraction gives the possibility of obtaining a satisfactory separation of americium from curium, the extraction factor of the americium $E_{Am}$ (which corresponds to the ratio of the flow rates of the organic and

TABLE II

| | S1 | | S2 | | S3 | | S4 | |
|---|---|---|---|---|---|---|---|---|
| | $D_M$ | $FS_{Am/M}$ | $D_M$ | $FS_{Am/M}$ | $D_M$ | $FS_{Am/M}$ | $D_M$ | $FS_{Am/M}$ |
| $^{241}$Am | 12 | 1.0 | 1.1 | 1.0 | 12 | 1.0 | 0.89 | 1.0 |
| $^{244}$Cm | 7.5 | 1.6 | 0.49 | 2.2 | 7.9 | 1.5 | 0.34 | 2.6 |
| Y | 1.3 | 9.2 | 0.02 | 55 | 1.4 | 8.6 | 0.02 | 45 |
| Gd | 4.2 | 2.9 | 0.17 | 6.5 | 4.9 | 2.4 | 0.04 | 22 |
| Eu | 9.2 | 1.3 | 0.14 | 7.9 | 7.3 | 1.6 | 0.10 | 8.9 |
| Sm | 11 | 1.1 | 0.68 | 1.6 | 11 | 1.1 | 1.3 | 0.7 |
| Nd | 16 | 0.8 | 2.1 | 0.5 | 13 | 0.9 | 3.7 | 0.2 |
| Pr | 14 | 0.9 | 3.1 | 0.4 | 13 | 0.9 | 4.9 | 0.2 |
| Ce | 16 | 0.8 | 3.7 | 0.3 | 13 | 0.9 | 5.3 | 0.2 |
| La | 8.8 | 1.4 | 3.3 | 0.3 | 7.1 | 1.7 | 4.0 | 0.2 |
| Pd | 1.0 | 12 | 10 | 0.1 | 0.4 | 30 | 1.8 | 0.5 |
| Mo | 8.4 | 1.4 | 4.4 | 0.3 | 8.8 | 1.4 | 6.7 | 0.1 |
| Zr | 32 | 0.4 | 0.013 | 85 | 48 | 0.3 | 0.006 | 148 |
| Fe | 0.09 | 133 | 0.12 | 9.2 | 0.09 | 133 | 0.15 | 5.9 |

This table shows that the presence of 0.015 mol/L of TEDGA in solution S2 is expressed by an increase in the separation factor between americium and curium, $FS_{Am/Cm}$, by almost 40% relatively to the one obtained for the solution S1, which has the same nitric acidity as the S2 solution ($HNO_3$=1 M) and which is without any TEDGA, while the presence of 0.030 mol/L of TEDGA in solution S4 is expressed by an increase in the separation factor $FS_{Am/Cm}$ by almost 75% relatively to the one obtained for the solution S3, which has the same nitric acidity as the solution S4 ($HNO_3$=1.9 M) but which is without any TEDGA.

It also shows that the presence of TEDGA in solutions S2 and S4 is expressed by a reduction in the distribution coefficients of americium and of curium $D_{Am}$ and $D_{Cm}$, relatively to the ones obtained in the absence of TEDGA. Thus, the presence of 0.015 mol/L of TEDGA in solution S2 causes $D_{Am}$ to fall from 12 to 1.1 and $D_{Cm}$ from 7.5 to 0.49 while the presence of 0.030 mol/L of TEDGA in solution S4 causes $D_{Am}$ fall from 12 to 0.89 and $D_{Cm}$ from 7.9 to 0.34.

It further shows that the presence of TEDGA in solutions S2 and S4 contributes to increasing the whole of the separaaqueous phases, noted as O/A, circulating in the extractor in which is achieved this extraction, multiplied by the distribution coefficient of the americium, $D_{Am}$) should be greater than 1 and that the extraction factor of the curium $E_{Cm}$ (which itself corresponds to the ratio O/A multiplied by the distribution coefficient of the curium $D_{Cm}$) should be less than 1.

As shown in Table II hereinbefore, in the absence of TEDGA, the $D_{Cm}$ are at least 7.5, which implies the use for the organic phase of a flow rate at least eight times less than the one used for the high activity aqueous solution if the intention is to obtain $E_{Am}$>1 and $E_{Cm}$<1. The result of this is a non-negligible risk of saturation of the organic phase with metal elements since the extracted elements would then be eight times more concentrated in the organic phase than in the aqueous solution.

On the other hand, by adding TEDGA to the high activity aqueous solution, it would be possible to use an O/A ratio of 1 or close to 1 (since the $D_{Cm}$ are less than 0.5), which is much more acceptable for an industrial application.

Further, the increase in the separation factor $FS_{Am/Cm}$ induced by TEDGA would give the possibility of achieving extraction of the americium in extractors including a number of stages much less than what would be necessary if this extraction had to be achieved without adding any TEDGA to the high activity aqueous solution.

Thus, for example, for recovering 99% of americium in the organic phase and leaving 99% of the curium in the aqueous phase, it would be possible to use 20 stages for a separation factor $FS_{Am/Cm}$ of 2.6 (as obtained for solution S4 in the present example) while 39 stages, i.e. twice the number, would be necessary for a separation factor $FS_{Am/Cm}$ of 1.5 (as obtained for solution S3 in the present example).

Moreover, the fact that in the presence of TEDGA, the <<lightweight>> lanthanides are much better extracted than americium and that the <<heavy>> lanthanides and yttrium are on the contrary much less extracted than the americium, would allow limitation of the risks of accumulation of these elements in the stages of the extractors where the extraction of americium would be achieved in the case of accumulation of americium and of curium because of the low selectivity of the organic phase towards the americium relatively to the curium. Thus, the amount of lanthanides present in the stages would be reduced relatively to the one present in a scheme not using TEDGA, which reduces the risk of saturation of the organic phase or of the complexing agents in an aqueous phase.

Finally, the inhibition of the extraction of the zirconium with TEDGA would give the possibility of suppressing the requirement of managing this element downstream from the process.

Once the americium is extracted from the high activity aqueous solution and thus separated from curium, its separation from the fission products having followed it in the organic phase may be achieved according to the same conditions as those recommended in the state of the art for separating actinides (III) from fission products, from an organic phase containing CMPO, for example in a cycle with the SETFICS method or in two cycles with the TALSPEAK method in the second cycle.

This example shows that the increase in the separation factor between the lanthanides and yttrium may also be used advantageously for separating rare earths from each other and particularly yttrium and rare earths, since the separation factor FS(Ln/Y) is greater than 7 with solution S2 (twice as strong as with S1), a value widely sufficient for recovering more than 99.9% of yttrium in an extraction aqueous phase with less than 0.1% of the lanthanides, with 16 stages.

Example 2

Extractions with an Organic Phase Containing TOPO and TBP in TPH

Extractions similar to those described in Example 1 hereinbefore were carried out by using the same aqueous solutions S1-S4 and the same operating procedure as those used in Example 1 but by using as organic phases, phases comprising 0.5 mol/L of TOPO (as a solvating extractant) and 1 mol/L of TBP (as a phase modifying agent) in TPH.

There also, each of the aqueous solutions S1-S4 were put in tubes in contact with one of the organic phases (acid-balanced beforehand by adding 1 M nitric acid in the case of solutions S1 and S2 and 1.9 M nitric acid in the case of solutions S3 and S4, in an amount of 1 volume of aqueous solution for 1 volume of organic phase, and the phases thereby put into contact were left for 30 minutes with stirring at a constant temperature of 25° C.

Next, after decantation and separation of the aqueous and organic phases, the activities of the americium and of the curium and the concentrations of the other metal elements in the aqueous and organic phases were determined as described in Example 1 hereinbefore.

Table III hereafter shows for each of the solutions S1-S4, the distribution coefficients $D_M$ and the separation factors $FS_{Am/M}$ obtained from the thereby determined activities and concentrations.

TABLE III

|  | S1 | | S2 | | S3 | | S4 | |
| --- | --- | --- | --- | --- | --- | --- | --- | --- |
|  | $D_M$ | $FS_{Am/M}$ | $D_M$ | $FS_{Am/M}$ | $D_M$ | $FS_{Am/M}$ | $D_M$ | $FS_{Am/M}$ |
| $^{241}$Am | 3.0 | 1.0 | 0.36 | 1.0 | 0.90 | 1.0 | 0.13 | 1.0 |
| $^{244}$Cm | 3.1 | 1.0 | 0.22 | 1.6 | 0.82 | 1.1 | 0.08 | 1.6 |
| Y | 3.5 | 0.9 | 0.07 | 5.1 | 1.7 | 0.5 | 0.05 | 2.6 |
| Gd | 3.0 | 1.0 | 0.22 | 1.6 | 1.4 | 0.6 | 0.05 | 2.6 |
| Eu | 5.6 | 0.5 | 0.20 | 1.8 | 1.7 | 0.5 | 0.07 | 1.9 |
| Sm | 4.7 | 0.6 | 0.55 | 0.7 | 1.6 | 0.6 | 0.48 | 0.3 |
| Nd | 2.8 | 1.1 | 0.69 | 0.5 | 0.89 | 1.0 | 0.43 | 0.3 |
| Pr | 2.2 | 1.4 | 0.71 | 0.5 | 0.74 | 1.2 | 0.38 | 0.3 |
| Ce | 1.7 | 1.8 | 0.63 | 0.6 | 0.56 | 1.6 | 0.31 | 0.4 |
| La | 0.70 | 4.3 | 0.32 | 1.1 | 0.26 | 3.5 | 0.14 | 0.9 |
| Pd | 11 | 0.3 | 4.5 | 0.1 | 1.2 | 0.8 | 3.1 | 0.0 |
| Mo | 10 | 0.3 | 6.0 | 0.1 | 8.8 | 0.1 | 3.5 | 0.0 |
| Zr | 47 | 0.1 | 0.038 | 9.5 | 96 | 0.01 | 0.042 | 3.1 |
| Fe | 0.14 | 21 | 0.18 | 2.0 | 0.10 | 9.0 | 0.11 | 1.2 |

This table shows that the presence of 0.015 mol/L of TEDGA in solution S2 is expressed by an increase in the separation factor between the americium and the curium by 60% relatively to the one obtained for solution S1, which has the same nitric acidity than solution S2 ($HNO_3$=1 M) but is free of TEDGA, while the presence of 0.030 mol/L of TEDGA in solution S4 is expressed by an increase in the separation factor between the americium and the curium by 45% relatively to the one obtained for solution S3, which has the same nitric acidity as the solution S4 ($HNO_3$=1.9 M) but is free of TEDGA.

The separation factors $FS_{Am/Cm}$ obtained for solutions S1 and S3, which are close to 1 for nitric acidities of 1 mol/L and of 1.9 mol/L, do not give the possibility of contemplating the use of an organic phase containing a mixture of TOPO and of TBP in an organic diluent of the TPH type, for extracting americium without the curium from a high activity aqueous solution.

On the other hand, the separation factors $FS_{Am/Cm}$ obtained for solutions S2 and S4, which are both 1.6, indicate that by adding TEDGA to the high activity solution, it would be possible to use an organic phase containing a mixture of TOPO and of TBP in an organic diluent of the TPH type in order to recover 99% of the americium in the organic phase and leave 99% of the curium in the aqueous phase with 48 stages of discontinuous contactors.

The distribution coefficients $D_{Am}$ obtained for solutions S2 and S4 (0.36 versus 0.13) show that in this case it would be preferable to be located at a nitric acidity of 1 mol/L so as to have an O/A ratio of less than 3.

As already observed in Example 1 hereinbefore, the presence of TEDGA in the solutions S2 and S4 enhances the separation of the <<lightweight>> lanthanides, from the <<heavy>> lanthanides and yttrium, which there also would allow limitation of the risks of accumulation of these elements in the stages of the contactors.

This other example also shows that the increase in the separation factor between lanthanides and yttrium may advantageously be used for separating rare earths from each other and particularly yttrium and rare earths, since the separation factor FS(Ln/Y) is greater than 7 with the solution S2 (twice stronger than with S1), a widely sufficient value for recovering more, than 99.9% of yttrium in an extraction aqueous phase with at least 0.1% of lanthanides, with 16 stages.

Example 3

Extractions with an Organic Phase Containing DMDOHEMA and HEDHP in TPH

Extractions were carried out by using:
as aqueous phases: two aqueous solutions—designated hereafter as S5, S6 and S7—simulating raffinates stemming from the processing with the PUREX method, of irradiated nuclear fuels of the UOX3 type (except for curium 244 which is only present in trace amounts in these solutions) and to which were added 0.05 mol/L of HEDTA in the case of solution S5, 0.05 mol/L of HEDTA and 0.05 mol/L of TEDGA in the case of solution S6 and 0.05 mol/L of HEDTA and 0.07 mol/L of TEDGA in the case of solution S7; and
as organic phases: phases comprising 0.6 mol/L of DMDOHEMA (as a solvating extractant) and 0.3 mol/L of HDEHP (as an acid extractant) in TPH.

The qualitative and quantitative compositions of the solutions S5, S6 and S7 are shown in Table IV hereafter.

All the metal elements present in these solutions were dissolved in the form of nitrates.

TABLE IV

| | Concentrations in mmol/L | | |
|---|---|---|---|
| | S5 | S6 | S7 |
| HNO$_3$ | 4000 | | 4000 |
| HEDTA | 50 | | 50 |
| TEDGA | — | 50 | 70 |
| $^{241}$Am | | 0.73 | |
| $^{244}$Cm | | 1.4·10$^{-5}$ | |
| Y | | 1.7 | |
| Gd | | 0.32 | |
| Eu | | 0.34 | |
| Sm | | 1.8 | |
| Nd | | 9.4 | |
| Pr | | 2.6 | |
| Ce | | 5.7 | |
| La | | 2.9 | |
| Pd | | 5.0 | |

TABLE IV-continued

| | Concentrations in mmol/L | | |
|---|---|---|---|
| | S5 | S6 | S7 |
| Mo | | 12 | |
| Zr | | 13 | |
| Fe | | 1.8 | |

Each of the solutions S5, S6 and S7 were put into contact in tubes with one of the organic phases (acid-balanced beforehand, with addition of 4 M nitric acid), volume to volume and the thereby contacted phases were left for 10 minutes with stirring at a constant temperature of 25° C.

After decantation and separation of the aqueous organic phases, the activities of the americium and of the curium were measured in each of these phases by α spectrometry.

The concentrations of the other metal elements were measured in the sole aqueous phases with ICP-AES. Consequently, the distribution coefficients, $D_M$, of these elements were determined by calculating the difference between their initial and final concentrations in the aqueous phase and by calculating the ratio between this difference and their initial concentration in the aqueous phase.

Table V hereafter shows, for each of the solutions S5, S6 and S7, the distribution coefficients $D_M$ and the separation factors $FS_{Am/M}$ obtained.

TABLE V

| | S5 | | S6 | | S7 | |
|---|---|---|---|---|---|---|
| | $D_M$ | $FS_{Am/M}$ | $D_M$ | $FS_{Am/M}$ | $D_M$ | $FS_{Am/M}$ |
| $^{241}$Am | 15 | 1.0 | 3.4 | 1.0 | 0.60 | 1.0 |
| $^{244}$Cm | 9.7 | 1.5 | 1.9 | 1.8 | 0.22 | 2.7 |
| Y | 2.8 | 5.3 | 0.14 | 24 | <0.02 | >30 |
| Gd | 5.2 | 2.9 | 0.56 | 6.1 | 0.03 | 20 |
| Eu | 7.8 | 1.9 | 0.96 | 3.5 | 0.07 | 8.6 |
| Sm | 9.8 | 1.5 | 1.0 | 3.4 | 0.2 | 3.0 |
| Nd | 10 | 1.5 | 3.1 | 1.1 | 1.0 | 0.6 |
| Pr | 11 | 1.4 | 3.7 | 0.9 | 1.8 | 0.3 |
| Ce | 12 | 1.3 | 4.0 | 0.9 | 2.1 | 0.3 |
| La | 8.5 | 1.8 | 3.4 | 1.0 | 2.1 | 0.3 |
| Pd | 0.05 | 300 | 0.05 | 68 | 0.05 | 12 |
| Mo | 50 | 0.3 | 46 | 0.07 | 50 | 0.01 |
| Zr | 1200 | 0.013 | 0.024 | 142 | 0.02 | 30 |
| Fe | 54 | 0.28 | 59 | 0.06 | 60 | 0.01 |

This table shows that, like in the previous examples, the presence of TEDGA in the solutions S6 or S7 enhances the separation factor between the americium and the curium as well as the separation factors between <<lightweight>> lanthanides and <<heavy>> lanthanides and yttrium.

CITED REFERENCES

[1] International PCT application WO 2007/135178
[2] ANSARI et al., *Separation and Purification Technology*, 66, 118-124, 2009
[3] SHIMOJO et al., *Dalton Transactions*, 37, 5083-5088, 2008
[4] MODOLO et al., *Solvent Extraction Ion Exchange*, 25, 703-720, 2007
[5] French patent application 2 810 679
[6] ANSARI et al., *Separation and Purification Technology*, 63, 239-242, 2008
[7] Japanese patent application 2005-114448
[8] French patent application 2 907 346

[9] SASAKI et al., *Analytical Sciences*, 23, 727-731, 2007
[10] French patent application 2 738 663
[11] WEAVER and KAPPELMAN, ORNL-3559 report, 1964
[12] French patent application 2 845 616
[13] BARON et al., *Proceedings of the International Conference on Back-End of the Fuel Cycle: From Research to Solutions GLOBAL* '01, Paris, France, 9-13 Sep. 2001, published by INIS-FR-1108
[14] DHAMI et al., *Separation Science & Technology*, 36(2), 325-335, 2001

What is claimed is:

1. A method for recovering americium from a nitric acid aqueous phase comprising americium and curium without recovering curium from the nitric acid aqueous phase, the method comprising an extraction operation, the extraction operation comprising:
    adding a complexing agent to the nitric acid aqueous phase, the complexing agent being a diglycolamide selected from N,N,N',N'-tetramethyldiglycolamide, N,N,N',N'-tetraethyldiglycolamide and N,N,N',N'-tetrapropyldiglycolamide;
    contacting the nitric acid aqueous phase with an organic phase which is non-miscible with water, the organic phase comprising at least one extractant other than a diglycolamide, in an organic diluent; and
    separating the nitric acid aqueous phase from the organic phase, thereby americium is recovered into the organic phase while curium remains in into the nitric acid aqueous phase.

2. The method of claim 1, wherein the diglycolamide is N,N,N',N'-tetraethyldiglycolamide.

3. The method of claim 1, wherein the nitric acid aqueous phase comprises from 0.01 to 0.5 mol/L of the diglycolamide.

4. The method of claim 1, wherein the extractant is a solvating extractant.

5. The method of claim 4, wherein the solvating extractant is selected from the group consisting of malonamides, carbamoylphosphine oxides, triisobutylphosphine sulfides, carbamoylphosphonates and mixtures thereof.

6. The method of claim 5, wherein the solvating extractant is a malonamide.

7. The method of claim 1, wherein the nitric acid aqueous phase is a nitric acid aqueous solution stemming from a processing of irradiated nuclear fuels.

8. The method of claim 7, wherein the nitric acid aqueous solution further comprises lanthanides.

9. The method of claim 8, wherein the nitric acid aqueous solution is a raffinate stemming from a processing of irradiated nuclear fuels with a PUREX or COEX method.

10. The method of claim 6, wherein the malonamide is N,N'-dimethyl-N,N'-dioctylhexylethoxymalonamide.

11. The method of claim 8, wherein the nitric acid aqueous solution further comprises fission products other than lanthanides and corrosion products.

* * * * *